N. RAEZ.
COMBINATION AGRICULTURAL IMPLEMENT.
APPLICATION FILED NOV. 5, 1908.
974,916.
Patented Nov. 8, 1910.
2 SHEETS—SHEET 1.
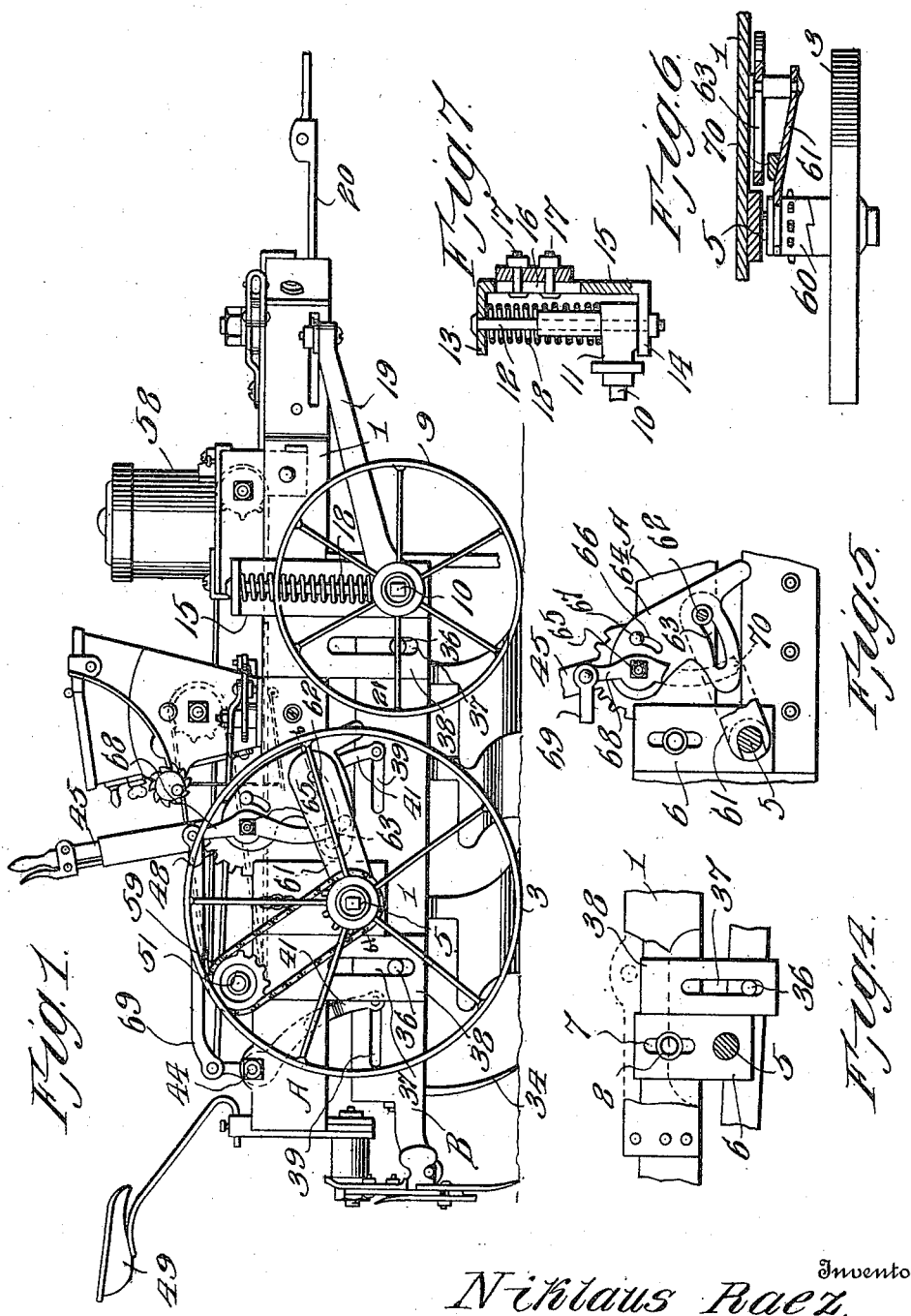
Witnesses
Frank Hough.
C. C. Hines.
Inventor:
Niklaus Raez,
By Victor J. Evans,
Attorney.

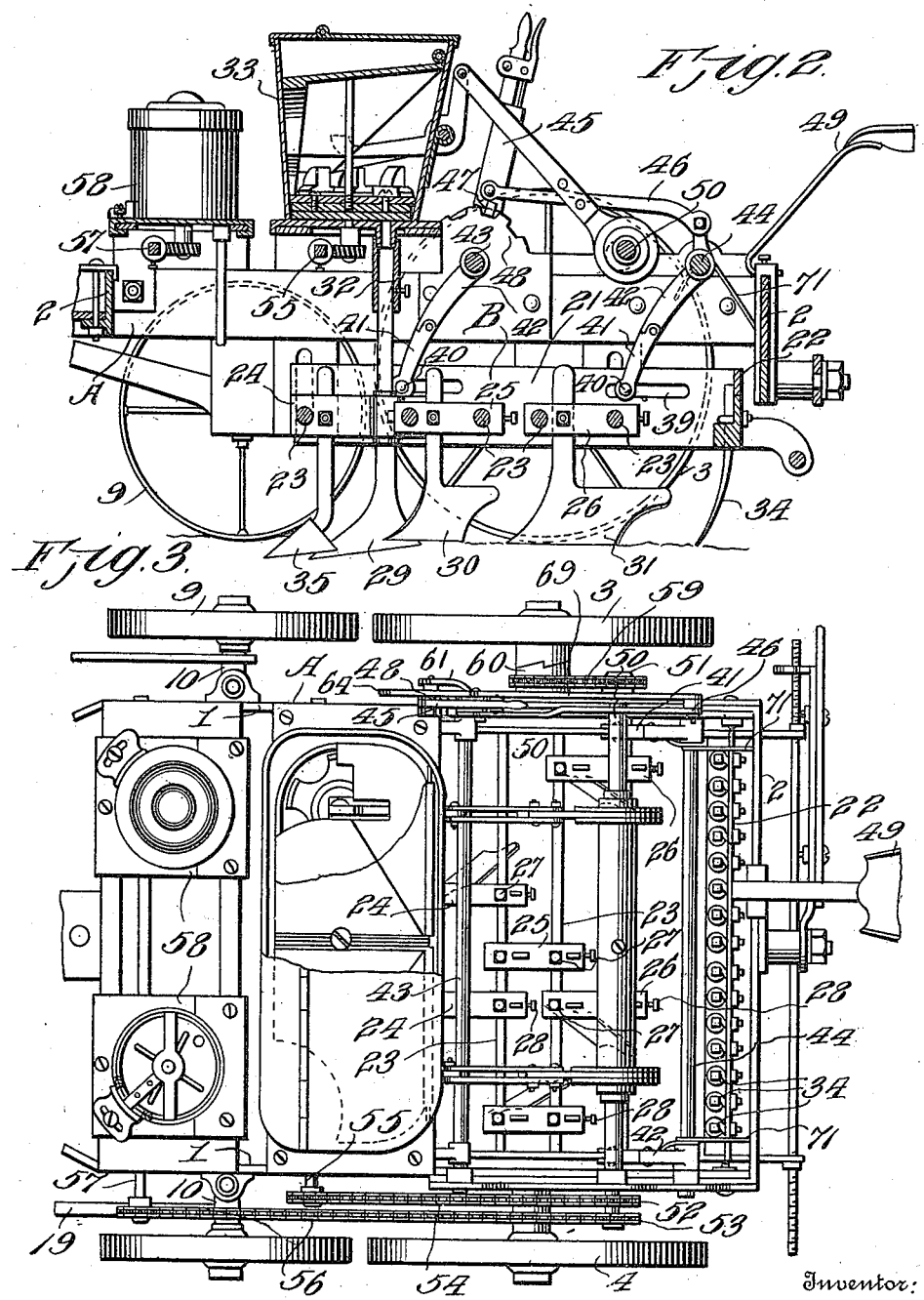

UNITED STATES PATENT OFFICE.

NIKLAUS RAEZ, OF ST. JOSEPH, MISSOURI.

COMBINATION AGRICULTURAL IMPLEMENT.

974,916.  Specification of Letters Patent.  Patented Nov. 8, 1910.

Application filed November 5, 1908. Serial No. 461,209.

*To all whom it may concern:*

Be it known that I, NIKLAUS RAEZ, a citizen of the United States, residing at St. Joseph, in the county of Buchanan and State of Missouri, have invented new and useful Improvements in Combination Agricultural Implements, of which the following is a specification.

This invention relates to agricultural implements, and particularly to combination implements of the character shown in my prior Patent No. 494,795, dated April 4, 1893.

The object of the invention is to provide novel means for vertically adjusting the main frame, raising and lowering the working tools, and throwing the seeding mechanism into and out of operation simultaneously with the lowering and raising of the tools, the last-named means being adjusted to accord with variations in the vertical adjustment of the main frame.

The invention consists of the features of construction, combination and arrangement of parts hereinafter described and claimed, reference being had to the accompanying drawings, in which:—

Figure 1 is a side elevation of the machine. Fig. 2 is a vertical longitudinal section of the same. Fig. 3 is a top plan view with parts broken away and in section. Fig. 4 is a detail view, showing features of construction. Fig. 5 is a detail view of the means for throwing the drive gearing of the seeder into and out of action. Fig. 6 is a sectional view of the same taken on the line 6—6 of Fig. 1. Fig. 7 is a detail sectional view, showing one of the adjustable supports for the front wheels.

Referring to the drawings, the letter "A" designates the main frame, which includes longitudinal side bars or plates 1 and cross plates or bars 2 connecting the same. The rear portion of this main frame is carried by supporting and drive wheels 3 and 4 provided with hubs which are journaled on spindles 5 projecting from bracket plates 6 fitted to slide in suitable vertical guideways on the side plates. Each bracket plate is provided with a vertical slot 7 for the passage of a fastening bolt 8, by which the spindles are secured for vertical adjustment on the frame so that the latter may be raised or lowered on the supporting wheel. By this means the rear portion of the frame may be elevated above its normal position to correspondingly raise the tool-carrying frame to an abnormal distance above the surface of the ground to prevent the tools from coming into contact with obstructions, as in transporting the implement from place-to-place.

The front portion of the frame is mounted upon wheels 9 journaled on supporting spindles 10 carried by arms 11. The inner end of each arm 11 is slidable vertically on a guide pin or bolt 12 mounted at its upper and lower ends in ears 13 and 14 on a bracket plate 15, said plate having a vertical slot 16 for the passage of a securing bolt or bolts 17 fastening it to the adjacent side plate of the frame. A coiled spring 18 surrounds the bolt 12 between the upper ear 13 and the spindle arm, whereby a yielding connection between the wheel and frame is afforded to permit relative vertical play between the same in passing over obstacles and irregularities of surface. This mode of attaching the bracket plates to the frame also permits the front wheels to be adjusted on the main frame to raise and lower the latter for the purpose hereinbefore described with reference to the rear wheels. The spindles have pivotal motion on the bolts 12 and are provided with forwardly extending arms or bars 19 connected in any suitable manner to the draft bar 20, through whose movements to the right or left the spindles will be turned on their pivot bolts to steer the machine.

Adjustably supported by the rear portion of the main frame is a supplemental frame "B" comprising side bars 21, a rear cross bar 22 and a series of parallel transverse rods 23. The rods 23, five in number, have slidably mounted thereon sets of tool carrier blocks 24, 25 and 26, which are adapted to be adjustably secured thereto by set screws 27. These blocks have vertical perforations to receive the shanks of the tools, which are adjustably secured thereto by set screws 28. In the present instance I have shown furrow forming, planting and covering tools or shovels 29, 30 and 31, respectively, carried by the blocks 24, 25 and 26 and arranged upon the rods for proper operation. As shown, the blocks 24 are perforated for the passage of the hollow shanks of the shovels 29, which extend upwardly for connection with the dropper tubes 32 of the seeder 33.

The rear cross bar 22 of the supplemental frame supports a series of harrow teeth 34, while the front blocks 24, in addition to supporting the shovels 29, may also support shovels 35 for preliminarily opening the ground. The front and rear rods of the supplemental frame have extended ends 36 which fit within vertical slots 37 in bracket plates 38 depending from the sides of the main frame, by which said supplemental frame is mounted for vertical adjustment. In order to provide for its adjustment, the sides of the supplemental frame are formed with slots 39 to slidably receive the coupling bolts 40 of links 41 connected with crank arms 42 on front and rear transverse shafts 43 and 44 journaled in bearings in the sides of the main frame. Connected with the front shaft 43 is an adjusting lever 45 coupled to the rear shaft 44 by a link and crank connection 46 and provided with a pawl 47 to interlock with a rack 48 on the main frame. By swinging said lever 45 forwardly or rearwardly the supplemental frame may be raised and lowered through the adjusting mechanism described to regulate the depth of penetration of the tools or to elevate the tools entirely from the ground. A driver's seat 49 is mounted in any suitable manner upon the rear portion of the main frame.

Journaled on the main frame between the front and rear rock shafts 43 and 44 is a transverse drive shaft 50 carrying at one end a sprocket wheel 51 and at its opposite end sprocket wheels 52 and 53. The sprocket wheel 52 is connected by a chain 54 with a sprocket wheel on the shaft 55 of the seeder 33, whereby the dropping mechanism within the seeder is operated, while the sprocket wheel 53 is connected by a chain 56 with a sprocket wheel on a shaft 57 arranged to operate the dropping devices of fertilizer distributers 58 mounted upon the front portion of the main frame. The sprocket wheel 51 is connected by a chain 59 with a sprocket toothed hub or sleeve 60 loosely mounted on the supporting spindle of the wheel 3 and provided at its outer end with clutch teeth to engage clutch teeth on the hub of said wheel, whereby motion may be transmitted from said wheel 3 to the drive shaft 50.

The inner end of the sleeve 60 is annularly grooved to receive the forked rear end of a spring metal shipper bar or arm 61, carrying at its forward end a pin or stud 62 engaging a segmental slot 63 in the lower portion of a bracket plate 64 fulcrumed at its upper portion upon a bolt 65 carried by the adjacent side of the main frame. The slot 63 is concentric with the pivot 65, permitting the bracket 64 to swing for adjustment to the stud 62 accordingly as the shipper bar 61 varies its angular arrangement to the main frame as the latter is raised or lowered through its adjustable connection with the brackets 6. Another slot 66 is formed in the bracket plate 64 adjacent to and in advance of the pivot 65 to receive a headed pin or stud 67 on the main frame, whereby said bracket is guided in its swinging movements and its extent of movement limited. A lever 68 is also pivotally mounted on the bolt 65 and connected at its upper end by a link 69 with a crank arm on the shaft 44, whereby the movement of the adjusting lever 45 in one direction or the other to raise or lower the supplemental frame will simultaneously swing the lever 68 forwardly or rearwardly. The shipper arm 61 normally holds the clutch member 60 retracted through its spring action or resiliency, and in order to effect the outward movement of said shipper arm to cause it to throw said clutch member 60 into engagement with the clutch hub of the wheel 3 the lever 68 is provided with a downwardly extending portion or arm 70 disposed between said shipper arm and the adjacent side of the frame and having a beveled surface for a cam action on the shipper arm. The arrangement of this cam surface is such that when the adjusting lever is moved to depress the tool-carrying frame, the cam arm 70 will simultaneously move downwardly and forwardly and force the shipper arm outward to throw the clutch members into engagement, thereby throwing the gearing into action to transmit motion to the drive shaft. When, on the other hand, the adjusting lever is moved to elevate the tool-carrying frame, the arm 70 will be adjusted to relax its pressure upon the shipper arm 61, allowing the latter to retract the clutch member 60 and throw the drive gearing out of action.

It will thus be seen that the invention provides a simple and effective means for adjusting the main frame vertically on the supporting wheels, for raising and lowering the tool carrier frame, and for simultaneously throwing the actuating gearing of the machine out of and into operation, the means controlling the gearing being automatically adjustable to compensate for any vertical adjustment of the main frame.

Springs 71 have coils engaging the shaft 44 and arms respectively connected with the crank arms 42 and bearing against the rear cross piece of the frame, and operate to partially sustain the weight of the supplemental frame and tools by their tendency to turn said shaft rearwardly. These springs relieve the lever 45 and its locking pawl of the weight of said supplemental frame and the pressure strain from the tools and, by partially sustaining the weight of the supplemental frame, adapts said lever 45 to be more easily and conveniently operated.

It will be understood that the machine may be used for a gang plow by properly adjusting the tools and using the kind of tools suitable for the purpose and in such use the driving mechanism connected with the said box is thrown out of gear, or by changing the tools a cultivator will be provided and by a further change a seeder, in the latter case the seeder mechanism being thrown into gear and operating in conjunction with the tools carried by the vertically movable frame. The various adjustments of the tools on the supplemental frame to suit the different kinds of work will be readily understood by those skilled in the art and need not be particularly referred to.

Having thus described the invention, I claim:—

1. In an agricultural implement of the class described, the combination of a main frame including side pieces having guide slots and a rear cross piece, front and rear transverse rock shafts journaled on said frame, a vertically adjustable supplemental frame disposed between the side pieces of the main frame and having guide members engaging said guide slots, said supplemental frame carrying tool supports, crank arms carried by the rock shafts, links pivotally connected with said arms and slidably and pivotally engaging the supplemental frame, a lever coupled to the front rock shaft and having a crank and link connection with the rear rock shaft, whereby said shafts are adapted to be rocked in unison, locking means embodying a pawl carried by the lever and a rack on the main frame for securing said lever in adjusted position, and supporting and cushioning springs having coils engaging the rear rock shaft and arms engaging the side pieces and rear cross piece of the main frame.

2. In an agricultural implement of the class described, the combination of a main frame having side pieces provided with vertical guide slots, front and rear transverse rock shafts journaled on said frame, a vertically adjustable supplemental frame disposed between the side pieces of the main frame, said supplemental frame including side pieces having longitudinal slots and transverse tool-carrying rods connecting the side pieces, the front and rear rods having extended ends engaging said vertical guide slots in the main frame, crank arms upon the rock shafts, links pivotally connected with said arms and slidably and pivotally engaging the longitudinal slots in the supplemental frame, a lever connected with the front rock shaft, a crank and link connection between the lever and rear rock shaft, and yielding means for partially supporting and for cushioning the movements of the supplemental frame.

3. In an agricultural implement of the class described, the combination of a main frame having side pieces provided with vertical guide slots, front and rear transverse rock shafts journaled on said frame, a vertically adjustable supplemental frame disposed between the side pieces of the main frame, said supplemental frame including side pieces having longitudinal slots and transverse tool-carrying rods connecting the side pieces, the front and rear rods having extended ends engaging said vertical guide slots in the main frame, crank arms upon the rock shafts, links pivotally connected with said arms and slidably and pivotally engaging the longitudinal slots in the supplemental frame, a lever connected with the front rock shaft, a crank and link connection between the lever and rear rock shaft, and supporting and cushioning springs having coils engaging the rear rock shaft and arms engaging the side pieces and rear cross piece of the main frame.

4. In an agricultural implement of the character described, the combination of a main frame including side pieces having vertical guide slots, supporting and driving wheels, a clutch for throwing one of the driving wheels into and out of action, a spring shifter for normally holding said clutch retracted, front and rear transverse rock shafts journaled on said frame, a vertically adjustable supplemental frame disposed between the side pieces of the main frame and having guide members engaging said guide slots, said supplemental frame carrying tool supports, crank arms carried by the rock shaft, links pivotally connected with said arms and slidably and pivotally engaging the supplemental frame, a lever coupled to the front rock shaft and having a crank and link connection with the rear rock shaft, whereby said shafts are adapted to be rocked in unison, a cam arm adjusted by said lever for adjusting said spring shifter to throw the clutch into action when the supplemental frame is lowered and permitting said shifter to throw the clutch out of action when the supplemental frame is raised to a determined height, and locking devices on the main frame and lever for securing the latter in adjusted position.

5. In an agricultural implement of the character described, the combination of a main frame including side pieces having vertical guide slots, supporting and driving wheels, a clutch for throwing one of the driving wheels into and out of action, a spring shifter for normally holding said clutch retracted, front and rear transverse rock shafts journaled on said frame, a vertically adjustable supplemental frame disposed between the side pieces of the main frame and having guide members engaging said guide slots, said supplemental frame carrying tool supports, crank arms carried by the rock shafts, links pivotally connected with said arms and slidably and pivotally engaging the supplemental frame, a lever coupled to the front rock shaft and having a crank and link connection with the rear rock shaft, whereby said shafts are adapted to be rocked in unison, a cam arm actuated by said lever for adjusting said spring shifter to throw the clutch into action when the supplemental frame is lowered and permitting said shifter to throw the clutch out of action when the supplemental frame is raised to a determined height, locking devices on the main frame and lever for securing the latter in adjusted position, and springs arranged to partially support the supplemental frame and cushion the movements of said frame and said lever.

In testimony whereof I affix my signature in presence of two witnesses.

NIKLAUS RAEZ.

Witnesses:
BERYL V. BYERS,
EDITH M. ARNOLD.